(12) United States Patent
Howard

(10) Patent No.: US 7,149,826 B2
(45) Date of Patent: Dec. 12, 2006

(54) PERIPHERAL DEVICE OUTPUT JOB ROUTING

(75) Inventor: Dennis W. Howard, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

(21) Appl. No.: 10/213,172

(22) Filed: Aug. 5, 2002

(65) Prior Publication Data

US 2004/0024835 A1 Feb. 5, 2004

(51) Int. Cl.
G06F 13/12 (2006.01)
G06F 3/00 (2006.01)
G06F 3/12 (2006.01)

(52) U.S. Cl. .................. 710/62; 710/5; 710/8; 710/15; 358/1.1; 358/1.15

(58) Field of Classification Search ................ 358/1.1; 710/8, 15, 62
See application file for complete search history.

(56) References Cited

U.S. PATENT DOCUMENTS

| | | | |
|---|---|---|---|
| 5,848,261 A * | 12/1998 | Farry et al. ................ 703/23 |
| 6,275,299 B1 * | 8/2001 | Beck .......................... 358/1.15 |
| 6,927,866 B1 * | 8/2005 | Konishi ...................... 358/1.13 |
| 6,965,958 B1 * | 11/2005 | Sugiyama .................... 710/104 |
| 2002/0138558 A1 * | 9/2002 | Ferlitsch ..................... 709/203 |
| 2003/0169444 A1 * | 9/2003 | Kemp et al. ................ 358/1.15 |
| 2003/0231328 A1 * | 12/2003 | Chapin et al. ............. 358/1.13 |
| 2004/0002943 A1 * | 1/2004 | Merrill et al. ................. 707/1 |
| 2004/0021906 A1 * | 2/2004 | Howard ..................... 358/1.16 |

* cited by examiner

Primary Examiner—Kim Huynh
Assistant Examiner—Alan S. Chen

(57) ABSTRACT

An address is obtained for storing data that is to be output with a peripheral device, as well as information for formatting the data to be compatible for being output by the peripheral device. A data file is written to a storage area at the address that has data that is formatted to be compatible for being output by the peripheral device. If data is detected at address by monitoring thereof, the address of the peripheral device is obtained and data in the data file is sent to the address of the peripheral device to be output

19 Claims, 4 Drawing Sheets

PERIPHERAL DEVICE OUTPUT JOB ROUTING

FIELD OF THE INVENTION

The present invention relates to outputting an output job at an output device such as a peripheral device. More particularly, the invention relates to routing an output job to a peripheral device.

BACKGROUND OF THE INVENTION

In many situations, an output device such as a peripheral device or a printer is coupled to a document processing device, such as a personal computer or a workstation, that helps render an output job (such as a print job) that is output by the peripheral device (e.g. printed by the printing device). The document processing device generates one or more output jobs to be output by the peripheral device. The document processing device can execute different kinds of applications each of which can generate an output job that can be output by the peripheral device upon a demand for same by a user. Prior to initiation of the demand for output, the user can input data, edit the data, delete the data, etc. For example, the output jobs can be generated by one or more application programs (e.g. word processing programs, electronic mail programs, drawing programs, spreadsheet programs, desk top publishing programs, etc.) executed by the document processing device.

The output jobs may include any type of graphical elements or information supported by the peripheral device, including text, pictures, and so forth. The document processing device typically translates the output job into a language that is understood by the peripheral device. Where the peripheral device is a printer, the language can be Printer Control Language (PCL) or Postscript. A particular peripheral device may understand a single language, thereby requiring the processing device to translate the output job into that single language. This type of peripheral device requires an attached processing device to convert the raw output job data into a format (i.e., language) that is understood by the peripheral device.

Some peripheral devices are capable of processing output jobs in multiple languages. These peripheral devices are typically more complicated because they are required to identify, interpret and process output commands in several different languages. Although these peripheral devices are more complicated, they typically require an attached processing device to provide the output job and other output control information to the peripheral device. Another type of peripheral device contains its own output rendering engine that is capable of generating an output document from raw output job data. Although this type of peripheral device contains its own output rendering engine, it is typically coupled to a document processing device, such as a computer, to receive the raw output job data generated, for example, by an application running on the computer.

The document processing device, typically in home and office environments, consistently communicates to one or more of the same peripheral devices each time that an output job is to be output thereon. In other situations, such as in mobile computing, the document processing device must direct output to a peripheral device upon which output has not been previously directed by the document processing device. To do so, the document processing device must have specific software corresponding to the specific peripheral device upon which the output job is to be output. By way of example, a specific printer driver must be installed on a personal computer (PC) that corresponds to a specific printer so that a document can be printed on the printer by executing a printing function of a document processing application executing on the PC. In that there are a great variety of printers and corresponding printer drivers that can be encountered in mobile computing, it is not likely that a personal computer would have all printer drivers installed thereon so as to readily direct print jobs to all corresponding printers. In practice, a time consuming process is required in which a PC user must determine the type of printer that is to be printed to. Then, the PC user must locate and install a compatible printer driver on the PC that corresponds to the printer that the PC user wants to print on. This process must be repeated for each different kind of printer that the PC user needs to use. It would be advantageous to advance compatibility and ease of use between a document processing device and a peripheral device upon which an output job is to be output. Consequently, there is a need for improved methods, programs, and systems that can provide such a capability.

SUMMARY OF THE INVENTION

The above-stated needs and/or others are met, for example, by methods, programs, and systems in which an address is obtained for storing data to be output with a peripheral device. A data file that is compatible to be output at the peripheral device is written to a storage area at the address. The storage area at the address is monitored to detect data to be output at the peripheral device. If the monitoring detects data, then the address of the peripheral device is obtained and data in the data file in the storage area at the address is sent to the address of the peripheral device to be output therefrom.

DESCRIPTION OF THE DRAWINGS

In the drawings, the same reference numbers are used throughout the drawings to reference like components and features.

DETAILED DESCRIPTION

Figure 1:
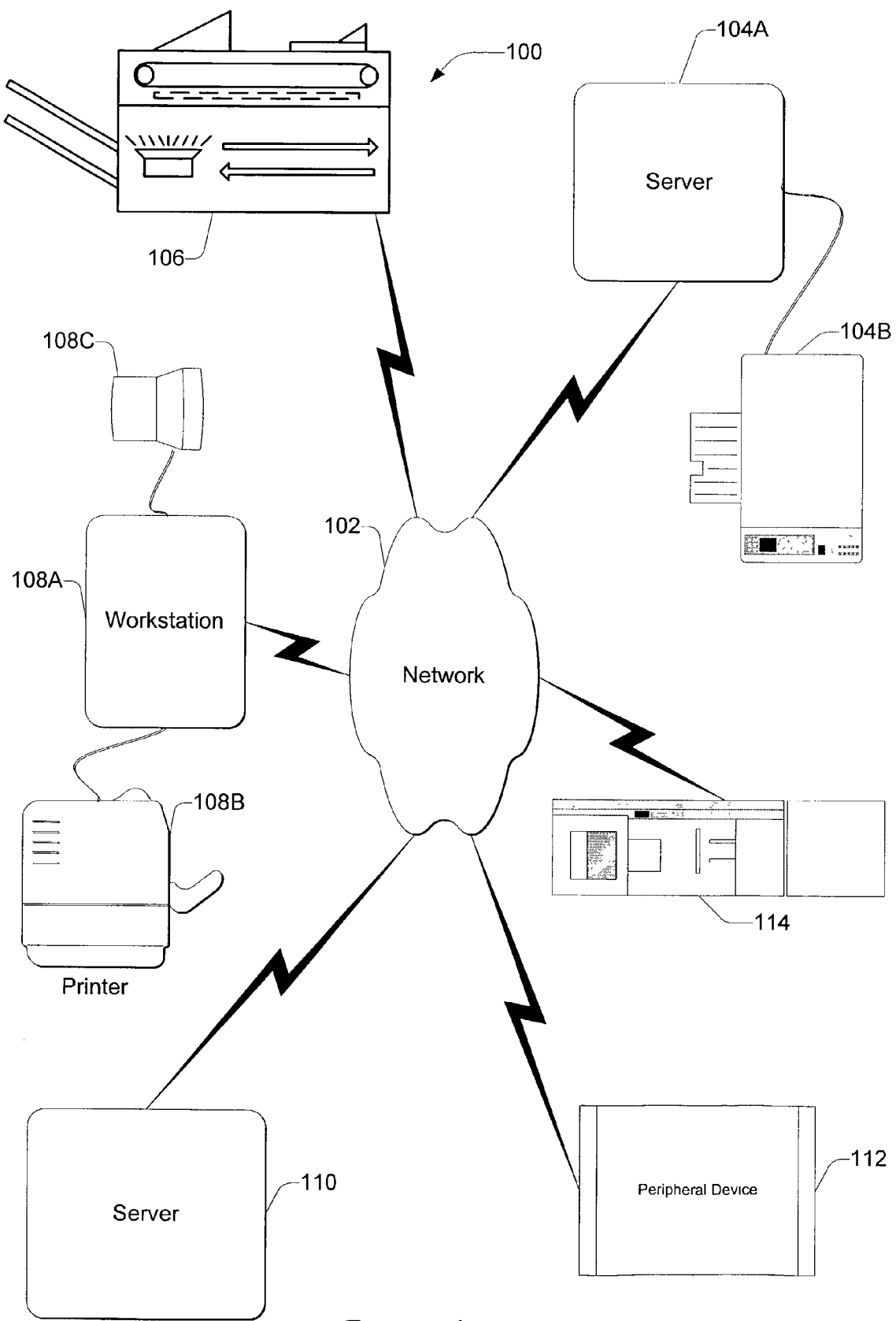
FIG. 1 illustrates a network environment in which multiple servers, workstations, and peripheral devices including printers are coupled to one another via an interconnected network.

The methods, programs, and systems, according to various embodiments of the present invention, relate to a document processing device, such as a personal computer (PC) that executes a document processing application, such as a word processor application, that creates and/or stores a document that is to output at a peripheral device, such as a printer. Where the PC has not previously directed a document for printing at the printer, the PC must first be set up. One such an environment that calls for the PC to be set up is in mobile computing. A typical mobile computing environment is that of a traveler who uses a laptop computer or other mobile computing device. The laptop computer has a document processing application installed thereon. The document processing application typically has a printer driver application that can be used to create a print data file containing a document that the traveler has stored and/or created. In order to print out the document, the traveler locates an available printer upon which to print the document. Public accommodations and meeting facilities, such as those often associated with the hospitality industry, often offer printers to guests for their use.

In order to print out on the printer that the traveler has located, the traveler installs on the laptop computer a configuration file, a printing solution application, and a print job router application. These data and applications can be obtained by copying same from portable media or by download from an interconnected network that is also in communication with the printer that the traveler has located. The traveler then operates the document processing application to request the printing function thereof so as to obtain the desired print out on the located printer.

The document processing application executes the printer driver application to write data from the document to a first print data file to be printed at the printer. The printing solution application, which can be executed in background, accesses the configuration file to obtain an address at which data from the document is to be stored that is to be printed at the printer and to obtain information on how to format or change the data in the first print data file so as to be compatible for printing at the printer. The data from the first print data file is written to a second print data file, in the compatible form or format, at the address at which data is to be stored that is to be printed at the printer.

The print job router application, which can be executed in background, accesses the configuration file to obtain the address at which data is to be stored that is to be printed at the printer. The address at which data is to be stored that is to be printed at the printer is monitored in background by execution of the print job router application so as to detect the presence of data stored thereat that is to be printed at the printer. When the print job router application detects the presence of data stored at the address that is to be printed at the printer, the configuration file is accessed by the print job router application to obtain an address of the printer. The data in the second print data file at the address at which data is to be stored that is to be printed at the printer is routed by the print job router application to the address of the printer for printing. The printer receives the data in the second print data file at the address obtained from the configuration file. Upon receipt, the printer may additionally process the data or may directly print out the data in a report. The traveler can then retrieve the print out having accomplished the desired result.

In one embodiment of the present invention, a server in communication with the interconnected network includes a storage area. The storage area contains the configuration file as well as installation software for installing the printing solution application and the print job router application. The traveler can connect the laptop computer to the interconnected network to request and receive from the storage area the configuration file and the installation software. Upon receipt, the laptop computer then operates upon the installation software to install both the printing solution application and the print job router application.

In one embodiment of the present invention, the printer has an Internet address and the data in the second print data file is transmitted over the Internet to the Internet address to be printed at the printer. In another embodiment of the present invention, the address of the printer is a network address on a local area network and the data in the second print data file is routed over the local area network to the network address to be printed at the printer.

FIG. 1 illustrates a network environment 100 in which a plurality of network resources are communication via an interconnected network 102. As such, multiple servers 104A, 110, workstations 108A, and peripheral devices 104B, 106, 108C, 108B, 112, 114 are coupled to one another via interconnected network 102. Interconnected network 102 couples together servers 104A and 110, computer workstations 108A, printers 104B, 106, 108B, 112, and 114, and a computer monitor 108C. Printers 104B, 108B and computer monitor 108C are coupled to interconnected network 102 through their respective local connections to server 104A and workstation 108A. Interconnected network 102 can be any type of network, such as a local area network (LAN) or a wide area network (WAN), using any type of network topology and any network communication protocol. In a particular embodiment, interconnected network 102 can be the Internet. Although only a few devices are shown coupled to interconnected network 102, a typical network may include tens or hundreds of devices coupled to one another. Furthermore, interconnected network 102 may be coupled to one or more other networks, thereby providing coupling between numerous devices.

Servers 104A and 110 may be file servers, e-mail servers, database servers, print servers, or any other type of network server. Workstation 108A can be any type of computing device, such as a mobile computing device, including a personal computer, a laptop computer, and a personal digital assistant (PDA). Although not shown in FIG. 1, one or more workstations and/or servers may contain a print rendering engine capable of converting raw print job data into a particular format (e.g., language) understood by certain types of printers.

Particular embodiments of the invention illustrate an ink jet printer 104B and laser printers 106, 108B. Alternate embodiments of the invention, however, are implemented with other output devices such as with peripheral device 112 that is illustrated as being in communication with interconnected network 102 independent of a server or work station. Peripheral device 112 is intended to represent an output device to which output can be directed from a computing device, including but not limited to, inkjet printers, bubble-jet printers, copiers, and fax machines. Additionally, peripheral device 112 can be any type of device that can output an output job, including by soft copy such as by video display or by hardcopy such as on paper, and any other type of printer including those referred to above. A digital press or network copier 114 is seen in FIG. 1 as a peripheral device to which output can be direct according to an embodiment of the present invention.

Figure 2:
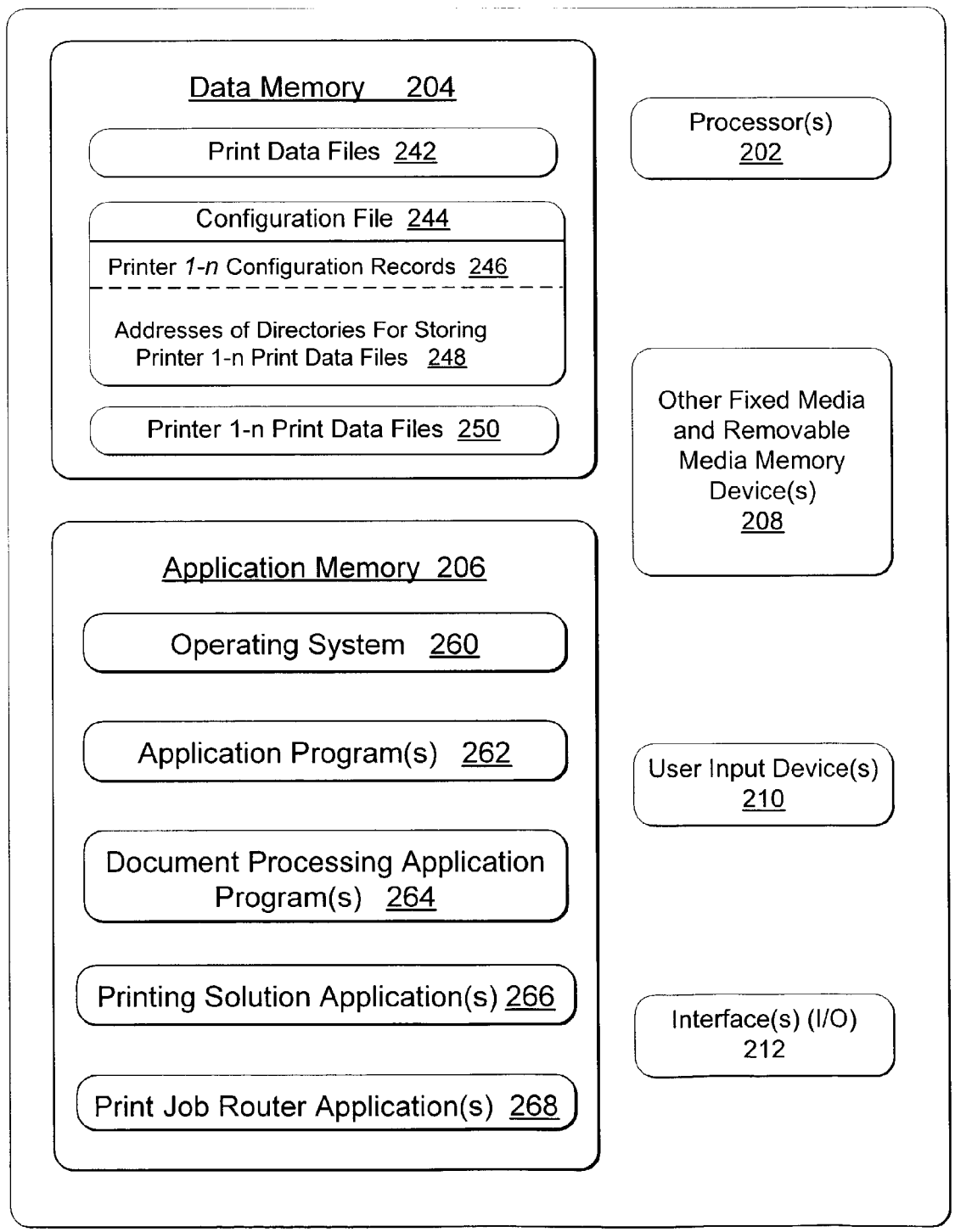
FIG. 2 is a block diagram showing pertinent components of a computer workstation in accordance with an embodiment of the present invention.

FIG. 2 is a block diagram showing pertinent components of a computer workstation 200 in accordance with the present invention. Workstation 200, which is a computing device, includes one or more processors 202, a data memory 204, an application memory 206, and other fixed media and removable media memory devices 208. Memory devices 204, 206, and 208, which provide data storage mechanisms, can be read-only memory (ROM), random access memory (RAM), a hard drive, a floppy disk drive, a CD-ROM drive, and other conventional memory device, and can be used to store an output buffer that contains a rendered version of a document, a bit map of an image of one of more page or segments of a document, or other versions of the document as is appropriate for a particular outputting environment. Other storage uses include a print spool or print buffer.

The one or more processors 202 perform various instructions to control the operation of workstation 200. The instructions can be in applications that can be stored in memory devices 204, 206, and 208. These applications include an operating system 260, a printer driver, a spooler program, and applications 264 to process a document such as word processing programs, electronic mail programs, drawing programs, spreadsheet programs, slide show programs, and desk top publishing programs, where some applications can include a spooler component. Also included in the applications executed by the one or more processors 202 are additional applications 262, a printing solution application 266, and a print job router application 268.

Data memory 204 includes various types and kinds of data. The data in print data files 242, which are stored in data memory 204, is formed by output from printer drivers. A configuration file 244 includes a plurality of configuration records, respectively for printers 1–n. Configuration file 244 also stores an address for each directory that is designated to store print data files for each of printers 1–n. Data memory 204 also stores a plurality of printer 1–n print data files 250 that are specifically formatted, respectively, for printers 1–n. The data in printer data files 250 is formed by the output that comes from the printing solution application 266.

User input device(s) 210 and interface(s) 212 can be used for inputting and outputting data. User input device(s) 210 include a keyboard, mouse, pointing device, or other mechanism for inputting information to workstation 200. Interface(s) 212 provide a mechanism for workstation 200 to communicate with other devices.

Workstation 200 can include a rendering engine that can be executed by the one or more processors 202 that is capable of processing data into a format understood by a peripheral device so as to be output therefrom. Similarly, the servers 104A, 110 and the workstation 108A seen in FIG. 1 can include respective rendering engines that can process raw data into a language understood by any printer or peripheral device on the network 102. These rendering engines can be capable of rendering a document into a directly printable format by incorporating any fonts, templates, or other data required to render the document.

Figure 3:
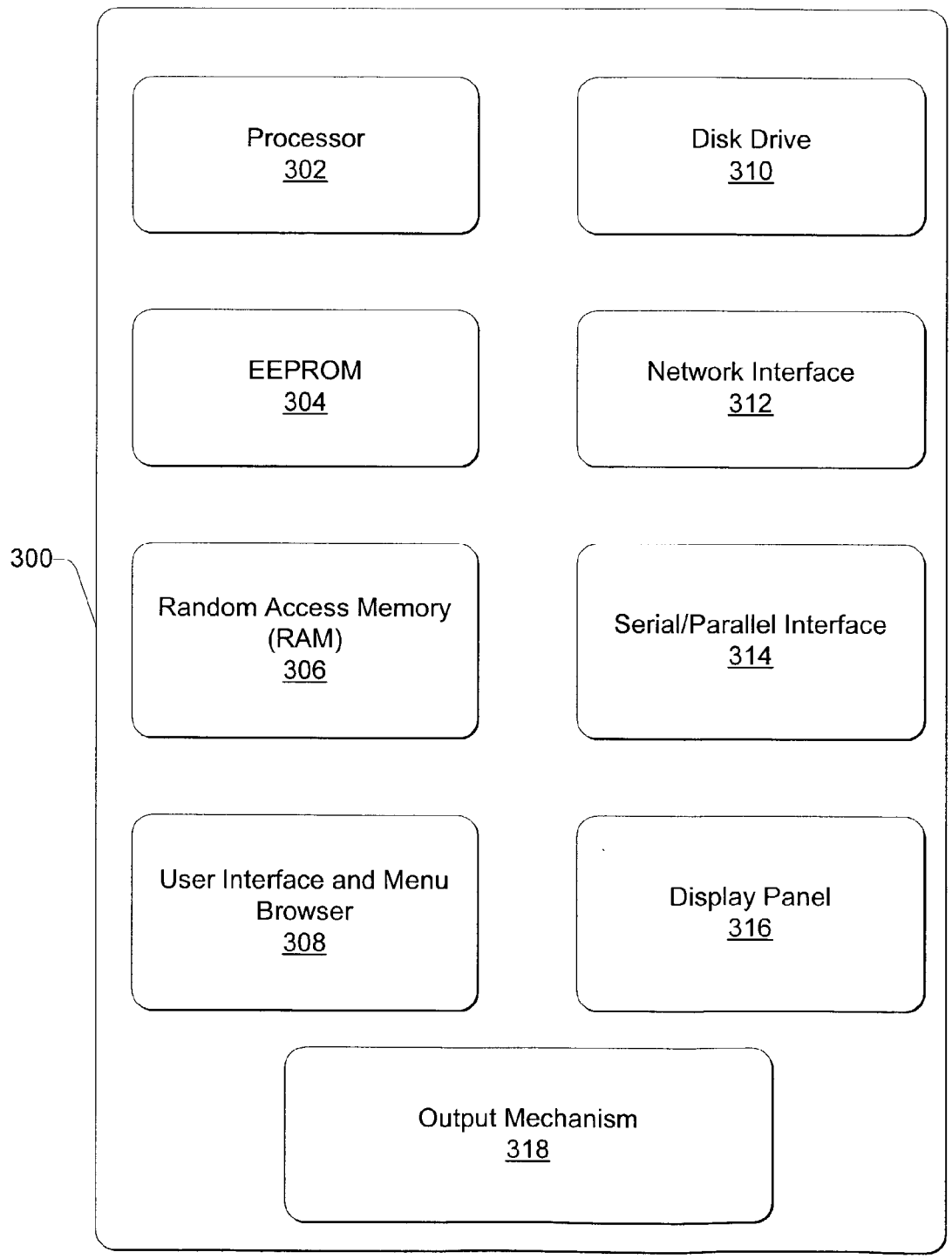
FIG. 3 is a block diagram showing pertinent components of a peripheral device in accordance with an embodiment of the present invention.

FIG. 3 is a block diagram showing pertinent components of a peripheral device 300 which can be used to output an output job. For example, peripheral device 300 can be a printer that includes one or more processors 302, hardware components of a printing device in an output mechanism 318, an electrically erasable programmable read-only memory (EEPROM) 304, and a random access memory (RAM) 306. The one or more processors 302 process various instructions necessary to operate peripheral device 300 and communicate with other devices. EEPROM 304 and RAM 306 can be used to store various types of information such as configuration information, fonts, templates, data being printed, and menu structure information. Although not shown in FIG. 3, a particular peripheral device may also contain a ROM (non-erasable) in place of or in addition to EEPROM 304.

Peripheral device 300 can optionally include a disk drive 310, a network interface 312, and a serial/parallel interface 314. Disk drive 310 provides additional storage for data being printed or other information used by peripheral device 300. Although both RAM 306 and disk drive 310 are illustrated in FIG. 3, a particular peripheral device may contain either RAM 306 or disk drive 310, depending on the storage needs of the peripheral device. For example, an inexpensive printer may contain a small amount of RAM 306, no disk drive 310, and a modest print engine, thereby reducing the manufacturing cost of the printer. As such, to print most documents, peripheral device 300 will require assistance from a rendering engine can that be found in a server or workstation with which peripheral device 300 is in communication.

The storage needs of the peripheral device may require the storage of a printer engine in any of the storage components described above. In one embodiment of the invention, peripheral device 300 stores an output buffer containing a pre-rendered document in one or more of RAM 306 and disk drive 310. In another embodiment of the invention, peripheral device 300 has a memory for storing a pre-rendered document received from an output buffer, where peripheral device 300 formats the pre-rendered document so that is can be output by output mechanism 318.

Network interface 312 provides a connection between peripheral device 300 and a data communication network, such as interconnected network 102 seen in FIG. 1. Network interface 312 allows devices coupled to a common data communication network to send print jobs and other information to peripheral device 300 via the network. Similarly, serial/parallel interface 314 provides a data communication path directly between peripheral device 300 and another device, such as a workstation, server, or other computing device. In one embodiment of the present invention, workstation 200 seen in FIG. 2 can direct data for printing from interfaces(s) 212 through interconnected network 102 to network interface 312 of peripheral device 300 to be printed out. In another embodiment of the present invention, workstation 200 directs data for printing from interfaces(s) 212 through a cable directly connected to serial/parallel interface 314 of peripheral device 300 to be printed out. Although the peripheral device 300 shown in FIG. 3 has two interfaces (network interface 312 and serial/parallel interface 314), a peripheral device may only contain one interface. Additionally, the interface can be other types of interfaces known in the art, such as Universal Serial Bus (USB), IEEE 1394, etc.

Peripheral device 300 can also contains a user interface/menu browser 308 and a display panel 316. User interface/menu browser 308 allows the user of peripheral device 300 to navigate a menu structure that is displayed by peripheral device 300 upon display panel 316. User interface 308 may be a series of buttons, switches or other indicators that are manipulated by the user of peripheral device 300. Display panel 316 can be a graphical display that provides information regarding the status of peripheral device 300 and the current options available through the menu structure. In a particular embodiment of the invention, the display panel 316 is a liquid crystal display having a two-dimensional array of pixels capable of generating various fonts, icons, and other images. In one implementation of the invention, user interface 308 is a touch-sensitive screen that overlays display panel 316. Thus, the user can provide input to peripheral device 300 by touching the appropriate portion of the touch screen. The touch screen is substantially transparent such that the images displayed on panel 316 are visible to the user through the touch screen. The touch screen may be used in combination with one or more physical buttons or switches on peripheral device 300.

The display panel 316 of peripheral device 300 displays various menu options to the user of peripheral device 300. The display panel 316 and associated control buttons allow the user of peripheral device 300 to navigate, for instance, a menu structure that has a hierarchy of menu elements. When one of the menu elements is selected, the display changes to illustrate the new menu elements in the next level of the hierarchy. Alternatively, if the selected menu element is a function or other action to be performed by peripheral device 300, the appropriate procedure is performed. For example, if the selected menu element outputs a particular document, then peripheral device 300, serving in the role of a peripheral device, performs the necessary operations to output the output job, such as by outputting a formatted version of a rendered document that is received by transfer from an output buffer or through network interface 312 from a data communication network.

Figure 4:
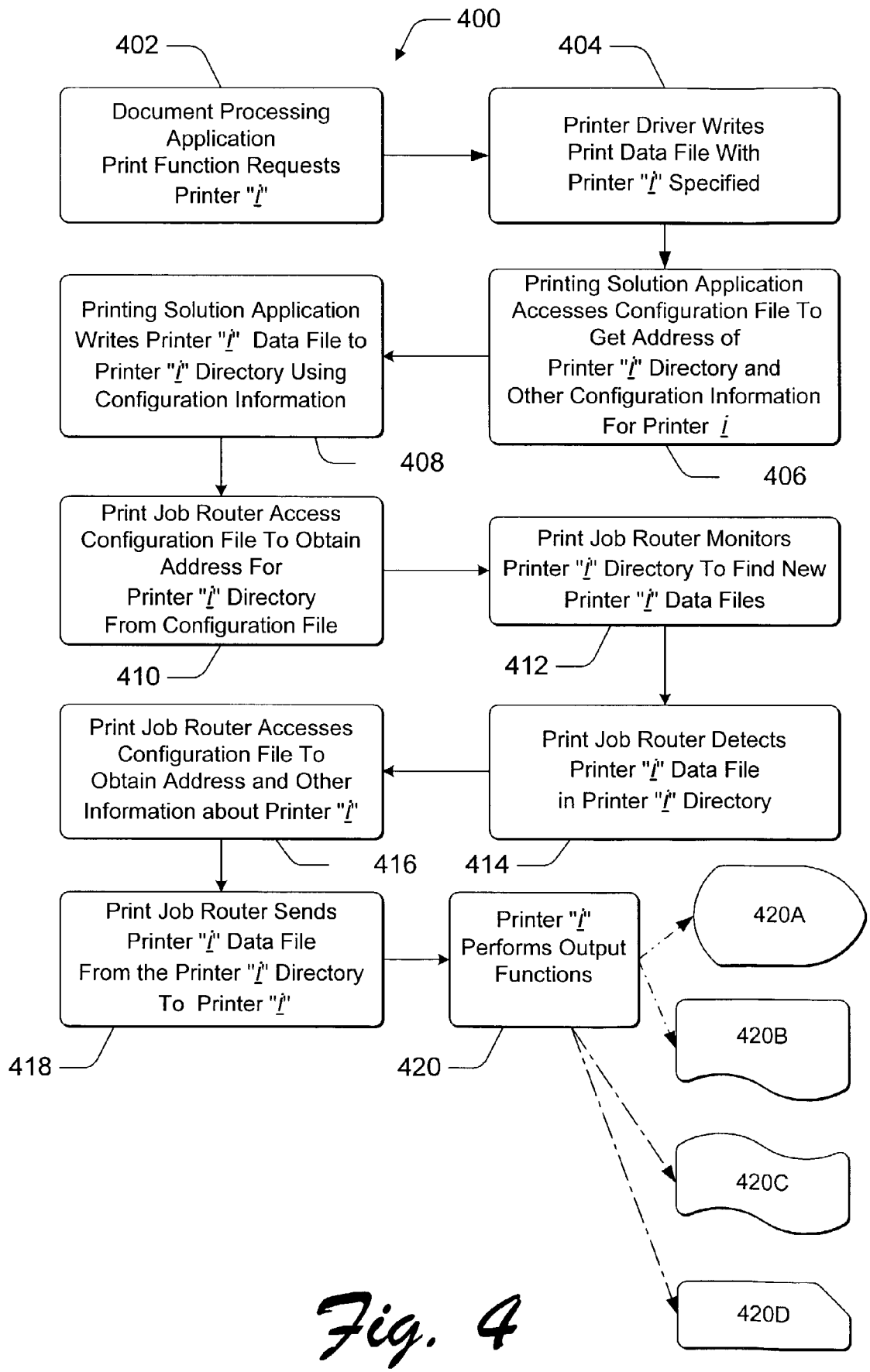
FIG. 4 is a flow diagram illustrating a procedure for processing a particular output job.

FIG. 4 is a flow diagram illustrating an embodiment of the present invention as depicted in a procedure 400 for processing a particular output job. Procedure 400 begins at block 402 where a document processing device executes a document processing application on one or more processors. A user can open a document using an operation of the document processing application. When the user wishes to output the document, the user inputs a request to the document processing application so as to initiate a print function. The input from the user specifies a particular peripheral device or printer "i" upon which the document is to be output or printed. The document processing application can be a word processing application (e.g. Word® software from Microsoft Corporation), a financial application (e.g. Money® software from Microsoft Corporation), a network browser (e.g. Internet Explorer® software from Microsoft Corporation), a network messaging application, a spreadsheet application (e.g. Excel® software from Microsoft Corporation), a data base maintenance application (e.g. Access® software from Microsoft Corporation), or slide show application (e.g. Power Point® software from Microsoft Corporation), where the user of the word processing application specifies a particular peripheral device (e.g. printer) at which to output a document.

At block 404, a printer driver writes a print data file with the printer "i" specified. The printer driver, which can be part of a printing solution application as discussed below with respect to block 406, is specific to printer "i". The printer driver can write a print data file locally. Alternatively, the print data file can be generated remotely by uploading from a client to a server. Following the generation of the print data file, the print data file is submitted for processing by the printing solution application at block 406. At block 406, a printing solution application is executed on the one or more processors. The printing solution application accesses a configuration file to obtain an address of a file directory that is designated to store data that is to be printed by the printer "i". Other configuration information with respect to the printer "i" can also be obtained during this access to the configuration file, such as information on how to change or format the data in the print data file so as to be compatible and 'printer-ready' for printing by the printer "i".

The configuration file can be structurally organized as a file having one or more record types therein, each of which contain fields having data therein that are of or relating to printing functions associated with one or more printers. Alternatively, the configuration file can be a registry containing entries each of which relates to printing functions associated with one or more printers. The availability of printers for printing can be included in the configuration file, as well as a respective network address or local addresses for each printer. The directory address of a directory in a file system that is to be used for each printer is defined in the configuration file. Information about the physical port connection for each printer can be kept such as network, serial, parallel, USB, IEEE 1394, and other communication protocol information. Characteristics and capabilities of each printer can also be kept in the configuration file, including color printing capabilities, laser or ink-jet capabilities, dot-matrix or laser capabilities, etc. By use of this information in the configuration file, data can be formatted, changed, or otherwise made compatible for printing at each respective printer.

The configuration file can be maintained by a PC user or by a network administrator of a network on which a network resource is found that stores the configuration file. As such, the configuration file can reside on a PC, a server, or on another network resource. The configuration file can be optimally maintained so as to permit the efficient and proper routing of output jobs to as many peripheral devices as is practical for a network of peripheral devices and potential users thereof.

At block 408, the printing solution application writes a printer "i" data file to the address of the file directory that is designated to store data that is to be printed by the printer "i" as was obtained from the configuration file and any other configuration information. The printing solution application, which can be called by the document processing application as part of a requested print function, analyzes or modifies the data in the print data file so that it can be sent to one or more printers. Where the user designates printing at a printer "i", the printing solution application can further evaluate the relative size of a print job, the characteristics of the print job (e.g. color vs. black and white), and other relevant information to determine an appropriate printer among several available printers assigned as printer "i". The printing solution application thus can change the print data file created by the printer driver from being in a first format into a second, different format that will include any special information about the specific printer to which a print job is to be directed. By way of example, the print job can be packaged with a special communication protocol that is specific to the intended printer. Additionally, the printing solution application can direct a single print job, made up of the print data created by the printer driver, to multiple printers each of which will receive a file having data that is formatted to be compatible with printing on the respective printer. To do so, the printing solution application uses printer-specific information found in the configuration file, such as which physical printers can be printed to, what their respective availability and capabilities are, what network or local address each printer has, and the respective local or network directories at which printer-specific print data files are to be stored for printing by each printer.

At block 410, a print job router application is executed on the one or more processors. The print job router application accesses the configuration file to obtain the address of the file directory that is designated to store data that is to be printed by the printer "i". At block 412, the print job router application performs a monitoring function to detect any new data that has been written in a file in the file directory that is designated to store data that is to be printed by the printer "i". When any such new data is detected during the monitoring function at block 414, at block 416 the print job router application accesses the configuration file to obtain the address of printer "i" as well as any other configuration information needed with respect to printer "i" for printing an output job at printer "i".

At block 418, the print job router application sends the data in the printer "i" data file from the printer "i" directory to printer "i". The data that is sent to the printer "i" is data that is specific to printer "i" that is based upon information obtained by the print job router application about printer "i"

from the configuration file. To do so, the print job router application reads the configuration file to obtain an address in a file system of a file directory that is designated for the user-specified printer "i". Once this directory address is obtained by the print job router application for each respective printer, the print job router application monitors each directory address in the file system specified in the configuration file to test for the presence of any new data that needs to be printed. When new data is found by the print job router application, the print job router application again reads the configuration file to obtain the local or network address that identifies the user-specified printer location. The information obtained by the print job router application can include physical port connection data for the user-specified printer (e.g. network port, serial port, parallel port, USB port, IEEE1394 protocol port, etc.). When the print job router application has obtained the address of the user-specified printer from the configuration file, the print job router application routes or transmits the data for printing to the user-specified printer. The print job router application uses physical port connection information to send the data for printing to the user-specified printer. Thus, each printer will receive data specific to that printer as directed by respective record(s) of the configuration file that is specific to that printer.

At block 420, the data is printed in a report. The printing of the job routed to printer "i" may require some specific formatting to be performed by printer "i" prior to the printing. The report requested can be made with a hardcopy printed report 420B, a continuous printout such as ticker tape 420C, or other hardcopy such as a punch card 420D. Alternatively, the output can be directed to a video projection or display device 420A so as to output a soft copy of the requested document. Following the outputting of the output job from the output buffer by the peripheral device, the output job of the document can optionally be removed from the file directory designated for printer "i", such as by logically and/or physically purging the relevant data and/or files. Procedure 400 can be repeated for each document processed by the document processing device.

The order in which the method is described with respect to procedure 400 is not intended to be construed as a limitation, and any number of the described method blocks can be combined in any order to implement the method. Furthermore, the method can be implemented in any suitable hardware, software, firmware, or combination thereof.

When procedure 400 is operated in an environment where the document processing device is a PC and the peripheral device is a printer, several parameters of operation can be implemented within the context of the rendering of the document in the PC and the rendering of the document in the printer. To process an entire print job, the printer may need the ability to interpret a language or format in which the document is stored. For example, if the document data is stored in a raw data format and the printer only understands the Printer Control Language (PCL) language, then the printer cannot process the document until some other device or process converts the raw data into a PCL format. Here, the PC can be this device or perform this process. However, if the document is already stored in a format that is understood by the printer, then the printer can process the document without assistance from an external device. If the printer can process the entire print job, then the document is printed by the printer. If the printer cannot process the entire print job, then the portions of the document (i.e., print job) that it cannot process are delegated to other processing devices.

In a particular embodiment of the present invention, the printer can only render documents that are formatted in the native language of the printer. Thus, the printer may require all portions of a particular print job to be processed by the PC if all portions of the print job are in a non-native language of the printer. By supporting only a native printing language, the cost of such a printer is reduced.

The document that can be output can have many forms. For instance, the document can be a letter containing text that is being edited by a word processing program, an electronic mail (e-mail) message that is being created by an e-mail program, a drawing that is created by the user by operating a drawing program, a spreadsheet that the user is constructing by operating a spreadsheet program, or a poster that is being designed by a user by operating a desk top publishing program. Other types of documents are also contemplated for use in embodiments of the present invention.

In one embodiment of the present invention, the peripheral device can be a printer, such as a simple dot matrix printer or a complex printer such as a digital press or a network printer. Complex printers can have capabilities that include high quality photo reproduction, multi-section reports with tabs, in-line mixed material insertion such as insertion of full-color preprinted copies and digital color-page insertion. Other complex printer capabilities include printing on substrates of varied composition, such as embossed, heavy-weight, multi-weight, and cover paper stock, as well as carbonless paper, blue prints, clear or colored transparency printing, and other specialty stock including preprinted offset color covers. Still other complex printer capabilities includes binding, collating, folding, stacking, stapling, stitching such as saddle stitching, edge-trimming, paginating for multi-language, and inline pagination and annotation. Still another printer is a multifunction peripheral (MFP), sometimes referred to as an "All-In-One", which combines two or more peripheral devices into a single device, such as printing, scanning, copying, and facsimile transmission. The printer can be a Graphical Display Interface (GDI) printer or a printer interpreting a page description language.

In another embodiment of the present invention, the document processing application executes on the processor of the document processing device to form a bitmap image of a document that is communicated to the peripheral device through the interconnected network. In still another embodiment of the present invention, the document processing application is included in a word processing application. In yet another embodiment of the present invention, the document processing application includes a spooler for spooling print jobs that are to be communicated to the peripheral device through the interconnected network or through a hardware port on a PC.

Thus, although some preferred embodiments of the various methods, systems, and programs of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A computer-readable medium having computer-executable instructions which, when executed on a processor, direct a computer to perform a method comprising:

writing with a printer driver a first print data file for data to be printed at an identified printer;

accessing a configuration file with a printing solution application to obtain a directory address at which data to be printed at the identified printer is to be stored and obtain printer-specific information on formatting data for printing at the identified printer;

modifying data of the first print data file to create a second print data file with the printing solution application and writing the second print data file to the directory address, wherein based on the printer-specific information, data in the second print data file is formatted by the printing solution application to be compatible for printing with the identified printer;

accessing the configuration file with a print job router application to obtain the directory address;

monitoring with the print job router application the directory address to detect the presence of data stored thereat that is to be printed at the identified printer; and responsive to detecting the presence of data stored at the direction address, using the print job router application in:

accessing the configuration file to obtain a printer address of the identified printer; and routing data in the second print data file to the printer address for printing.

2. The computer-readable medium as defined in claim 1, wherein:

the printer address of the identified printer is an Internet address; and the routing data in the second print data file further comprises transmitting the data in the second print data file over the Internet to the Internet address for printing at the identified printer.

3. The computer-readable medium as defined in claim 1, wherein:

the printer address of the identified printer is a network address on a local area network; and the routing data in the second print data file further comprises transmitting the data in the second print data file over the local area network to the network address for printing at the identified printer.

4. The computer-readable medium as defined in claim 1, further comprising, prior to the accessing the configuration file:

installing in a memory of the computer at least one of the configuration file, the printing solution application, and the print job router application, where the configuration file contains:

the directory address at which data to be printed at the identified printer is to be stored; and the printer address of the identified printer.

5. The computer-readable medium as defined in claim 1, further comprising generating the data to be printed at the identified printer with a document processing application.

6. The computer-readable medium as defined in claim 1, wherein the data of the first print data file is in a non-native language of the identified printer and the data of the second print data file is in a native language of the identified printer.

7. A client device comprising a processor in communication with a memory, wherein:

the memory includes a printer driver, a printing solution application, a configuration file, and a print job router application;

the processor executes the printer driver to write a first print data file for data to be printed at an identified printer;

the processor executes the printing solution application to:

access the configuration file to obtain a directory address at which data to be printed at the identified printer is to be stored and obtain printer-specific information on formatting data for printing at the identified printer; and modify data from the first print data file to create a second print data file and write the second print data file to the directory address, wherein based on the printer-specific information, data in the second print data file is formatted to be compatible for printing with the identified printer;

the processor executes the print job router application to:

access the configuration file to obtain the directory address;

monitor the directory address to detect the presence of data stored thereat that is to be printed at the identified printer; and after detecting the presence of data stored at the directory address:

access the configuration file to obtain a printer address of the identified printer; and route data in the second print data file to the printer address for printing.

8. The client device as defined in claim 7, wherein:

the printer address of the identified printer is an Internet address; and the routing of the data in the second print data file further comprises transmitting the data in the second print data file over the Internet to the Internet address for printing at the identified printer.

9. The client device as defined in claim 7, wherein:

the printer address of the identified printer is a network address on a local area network; and the routing of the data in the second print data file further comprises transmitting the data in the second print data file over the local area network to the network address for printing at the identified printer.

10. The client device as defined in claim 7, wherein the memory includes a document processing application for generating the data to be printed at the identified printer.

11. The client device as defined in claim 7, wherein the data of the first print data file is in a non-native language of the identified printer and the data of the second print data file is in a native language of the identified printer.

12. A system comprising:

an interconnected network;

a printer in communication with the interconnected network;

a client device in communication with the interconnected network and including a processor in communication with a memory including a configuration file, the memory having installed thereon a printer driver, a printing solution application, and a print job router application; wherein:

the processor executes the printer driver to write a first print data file for data to be printed at the printer;

the processor executes the printing solution application to:

access the configuration file to obtain a directory address at which data to be printed at the printer is to be stored and obtain printer-specific information on formatting data for printing at the printer; and modify data from the first print data file to create a second print data file and write the second print data file to the directory address, wherein based on the printer-specific information, data in the second print data file is formatted to be compatible for printing with the printer;

the processor executes the print job router application to:
  access the configuration file to obtain the directory address;
  monitor the directory address to detect the presence of data stored thereat that is to be printed at the printer; and
  after detecting the presence of data stored at the directory address:
    access the configuration file to obtain a printer address of the printer; and
    route data in the second print data file to the printer address for printing.

13. The system as defined in claim 12, further comprising a server in communication with the interconnected network and including a storage area to contain the configuration file and installation software for the printing solution application, and the print job router application; and
  wherein the memory of the client device further includes a software installation application that, when executed by the processor:
    requests and receives from the storage area of the server through the interconnected network:
      the configuration file; and
      the installation software; and
    installs in the memory, from the installation software, the printing solution application and the print job router application.

14. The system as defined in claim 12, wherein:
the printer address of the printer is an Internet address; and
the routing of the data in the second print data file further comprises transmitting the data in the second print data file over the Internet to the Internet address for printing at the printer.

15. The system as defined in claim 12, wherein:
the printer address of the printer is a network address on a local area network; and
the routing of the data in the second print data file further comprises transmitting the data in the second print data file over the local area network to the network address for printing at the printer.

16. The system as defined in claim 12, wherein:
the printer receives the data in the second print data file through the interconnected network; and
the printer prints a report containing the data in the second print data file.

17. The system as defined in claim 16, wherein the data in the second print data file that is received by the printer is received in a printer engine executing on a processor in the printer.

18. The system as defined in claim 12, wherein the memory of the client device has installed thereon a document processing application for generating the data to be printed at the printer.

19. The system as defined in claim 12, wherein the data of the first print data file is in a non-native language of the printer and the data of the second print data file is in a native language of the printer.

* * * * *

UNITED STATES PATENT AND TRADEMARK OFFICE
CERTIFICATE OF CORRECTION

PATENT NO. : 7,149,826 B2  Page 1 of 1
APPLICATION NO. : 10/213172
DATED : December 12, 2006
INVENTOR(S) : Dennis W. Howard It is certified that error appears in the above-identified patent and that said Letters Patent is hereby corrected as shown below:

In column 11, line 21, in Claim 1, delete "direction" and insert -- directory --, therefor.

Signed and Sealed this

Nineteenth Day of May, 2009

JOHN DOLL
*Acting Director of the United States Patent and Trademark Office*